L. JAKUBOWSKI.
BIRD TRAP.
APPLICATION FILED MAR. 19, 1919.
1,374,014.
Patented Apr. 5, 1921.
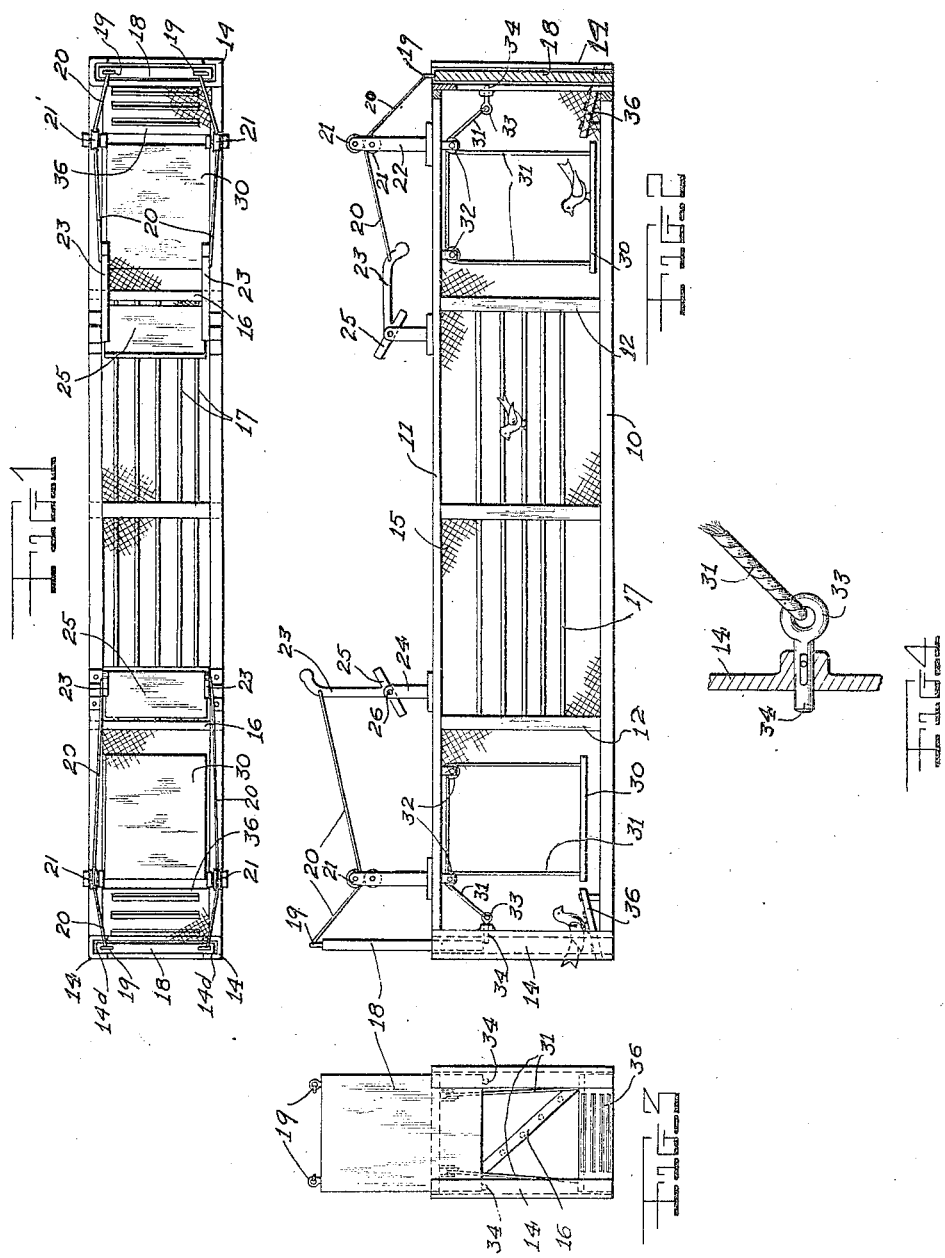
INVENTOR
LUCIAN JAKUBOWSKI
BY
ATTORNEYS

UNITED STATES PATENT OFFICE.

LUCIAN JAKUBOWSKI, OF DEXTER, NEW YORK.

BIRD-TRAP.

1,374,014. Specification of Letters Patent. Patented Apr. 5, 1921.

Application filed March 19, 1919. Serial No. 283,555.

*To all whom it may concern:*

Be it known that I, LUCIAN JAKUBOWSKI, a citizen of Russia, residing at Dexter, county of Jefferson, and State of New York, have invented certain new and useful Improvements in Bird-Traps, of which the following is a specification.

This invention relates to improvements in traps for catching small birds, and has as its special object the provision of a simple and effective trap whereby birds may be securely confined until manually released.

A further object is to provide a trap comprised of few and simple parts which may be readily made and which catches the bird without in any way doing harm to it.

These and other like objects are attained by the novel construction and combination of parts hereinafter described, and shown in the accompanying drawings, forming a material part of this disclosure, and in which:—

Figure 1 is a top plan view showing a bird trap made in accordance with the invention.

Fig. 2 is a longitudinal side elevational view thereof.

Fig. 3 is an end view of the same.

Fig. 4 is an enlarged detail view, partly in section, showing how the pins are inserted in the door posts.

The trap consists of a platform or baseboard 10, and top or rails 11, supported by a plurality of uprights 12, and having vertically bent plates 14 at each corner provided with vertical grooves 14ª, the sides of the trap being formed by a wire netting 15, as indicated. Two traps are shown, one at each end of the device.

Disposed transversely at intervals within the trap are diagonally positioned bars 16, between the center pair of which are extended rods 17, acting as perches for the birds. Slidably fitted to the vertical corner posts 14 are doors 18 having rings 19 at their upper ends, to which are attached cords, or similar flexible elements 20, passing between a pair of pulleys 21, rotatable on brackets 22 raised above the rails 11, the inner ends of the cords being attached to bars 23, pivoted in brackets 24, and having at their lower ends plates 25 which with the bars are rotatably mounted upon pins 26. The plates 25 are provided in order to increase the moment of inertia of the bars 23 about the pivots of the latter. Thus, after the pins 34 have been withdrawn from under the door 18 by the weight of the bird upon the platform 30, said door will fall. When the door in falling reaches a position near the base of the entrance, the cords 20 will pull upon the bars 23. Thus, the shock of the falling door will be lessened. By provision of the plates 25 as above-mentioned, the force necessary to rotate said plates will be greater, so that the greater part of the impact of the falling door will be transmitted to said plates and absorbed in the rotation through an angle, of said plates. Therefore the door will close with practically no noise which might frighten away another bird at the other end of the trap.

Disposed within the ends of the structure are relatively small platforms 30, supported upon flexible cords 31 passing over small pulleys 32 at the corners, the cords being engaged with eyes 33 secured to pins 34, normally projecting slightly into the guide posts 14, so as to support the doors 18 in a raised position.

Leading in from the entrance between the posts 14, are inclined platforms 36, so that a bird entering may readily hop upon the surface of the suspended platforms 30, the weight of the bird overcoming the frictional resistance of the pins 34 releasing the doors 18, which drop by gravity, confining the bird therein and obviously the bird may enter the inner compartments and rest upon the perches 17 until released.

From the foregoing it will be clear that if a bird hops onto the platform 30, its weight will release the pins 34 supporting the door 18, to the ring 19 of which the end of cord 20 is secured, and exert a pull on this cord which will turn the bar 23 down around its pivot, as the other end of the cord is secured to the upper end of this bar. The plate 25 will participate in this movement and retard the same, thus retarding also the downward movement of the door so as to make the same almost non-perceptive in order to allow as many birds as may follow the first one to enter the trap.

From the foregoing it will be seen that a simple and inexpensive trap has been disclosed, capable of catching small birds alive, one or more of which may enter the trap and become confined therein immediately upon their alighting upon the platform 30, the movement of which releases the pins 34 and permits the doors 18 to drop, securing the intruder in the trap.

Having thus described my invention, what I claim as new and desire to secure by Letters Patent, is:—

A device of the class described comprising a substantially rectangular frame, vertical posts at one end of said frame, vertical grooves on the inner sides of said posts, a door adapted to slide vertically in said grooves between said posts, eyelets on the top of said door, cords attached to said eyelets, pulleys mounted upon the top of said frame, said cords passing between said pulleys, a bar pivotally mounted on the top of said frame, said cords being secured to the end of said bar, a hanging platform in said frame, cords attached to said platform, pulleys in said frame, said last-named cords passing over said pulleys, holes in said posts communicating with said grooves, pins adapted to slide in said holes, eyelets on said pins, said last-named cords being attached to said last-named eyelets.

In testimony whereof I have affixed my signature.

LUCIAN JAKUBOWSKI.